United States Patent [19]
Nakaoka et al.

[11] Patent Number: 5,921,164
[45] Date of Patent: Jul. 13, 1999

[54] CONTROL VALVE ASSEMBLY FOR POWER CYLINDER IN POWER-ASSISTED STEERING SYSTEM

[75] Inventors: Masaki Nakaoka, Toyota; Junro Yamamoto, Susono; Yoshikazu Kameda; Mitsugu Kikuchi, both of Toyota, all of Japan

[73] Assignee: Toyota Jidosha Kabushiki Kaisha, Toyota, Japan

[21] Appl. No.: 08/883,101

[22] Filed: Jun. 26, 1997

[51] Int. Cl.⁶ ..................................................... F15B 9/10
[52] U.S. Cl. ........................................................ 91/375 R
[58] Field of Search .............................. 91/375 R, 375 A

[56] References Cited

U.S. PATENT DOCUMENTS

| | | | |
|---|---|---|---|
| 4,481,866 | 11/1984 | Matouka | 91/375 A |
| 4,793,433 | 12/1988 | Emori et al. | 91/375 A |
| 4,966,192 | 10/1990 | Umeda | 91/375 A |
| 5,339,917 | 8/1994 | Eberhard | 91/375 A |

FOREIGN PATENT DOCUMENTS

| | | | |
|---|---|---|---|
| 4235633 | 4/1994 | Germany | 91/375 A |
| A 2-106467 | 4/1990 | Japan . | |
| A 7-205825 | 8/1995 | Japan . | |
| 2235171 | 2/1991 | United Kingdom | 91/375 A |

*Primary Examiner*—F. Daniel Lopez
*Attorney, Agent, or Firm*—Oliff & Berridge, PLC

[57] ABSTRACT

An adjusting mechanism in a control valve assembly for a power cylinder in a power-assisted steering system of an automotive vehicle for adjusting a steering effort to be applied to a steering wheel placed in a neutral position, wherein the adjusting mechanism is provided with an adjusting-element located outside a housing of the control valve assembly to be operated for adjusting a load applied to the components of the control valve assembly.

3 Claims, 4 Drawing Sheets

CONTROL VALVE ASSEMBLY FOR POWER CYLINDER IN POWER-ASSISTED STEERING SYSTEM

BACKGROUND OF THE INVENTION

1. Field of the Invention

The present invention relates to a control valve assembly for a power cylinder in a power-assisted steering system of an automotive vehicle, and more particularly to an adjusting mechanism in the control valve assembly for adjustment of a steering effort to be applied to a steering wheel placed in a neutral position.

2. Description of the Prior Art

In Japanese Patent Laid-open Publication No. 7(1995)-205825, there is disclosed an adjusting mechanism in a control valve assembly for a power cylinder in a power-assisted steering system, wherein all the component parts of the adjusting mechanism are assembled within a housing of the control valve assembly for adjusting a steering effort to be applied to a steering wheel placed in a neutral position. In the control valve assembly, the steering effort may not be adjusted after the component parts of the control valve assembly have been assembled. It is, therefore, required to disassemble the control valve assembly for adjustment of the steering effort and to assemble the component parts of the control valve assembly.

SUMMARY OF THE INVENTION

Accordingly, a primary object of the present invention is to provide an adjusting mechanism in a control valve assembly capable of adjusting the steering effort In a simple manner in a condition where the component parts of the control valve assembly have been assembled within the valve housing.

According to the present invention, the object is attained by providing an adjusting mechanism In a control valve assembly for a power cylinder in a power-assisted steering system for adjusting a steering effort to be applied to a steering wheel placed in a neutral position, the adjusting mechanism including resilient means for applying a load against the steering effort to the components of the control valve assembly and an adjusting element for adjusting the load applied to the components of the control valve assembly, wherein the adjusting element of the adjusting mechanism is located outside a housing of the control valve assembly to be operated for adjustment of the steering effort.

According to an aspect of the present invention, the adjusting element of the adjusting mechanism is in the form of an adjusting screw coaxially assembled with an input shaft extended outwardly from the housing of the control valve assembly for connection to the steering wheel to be operated outside the housing of the control valve assembly.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
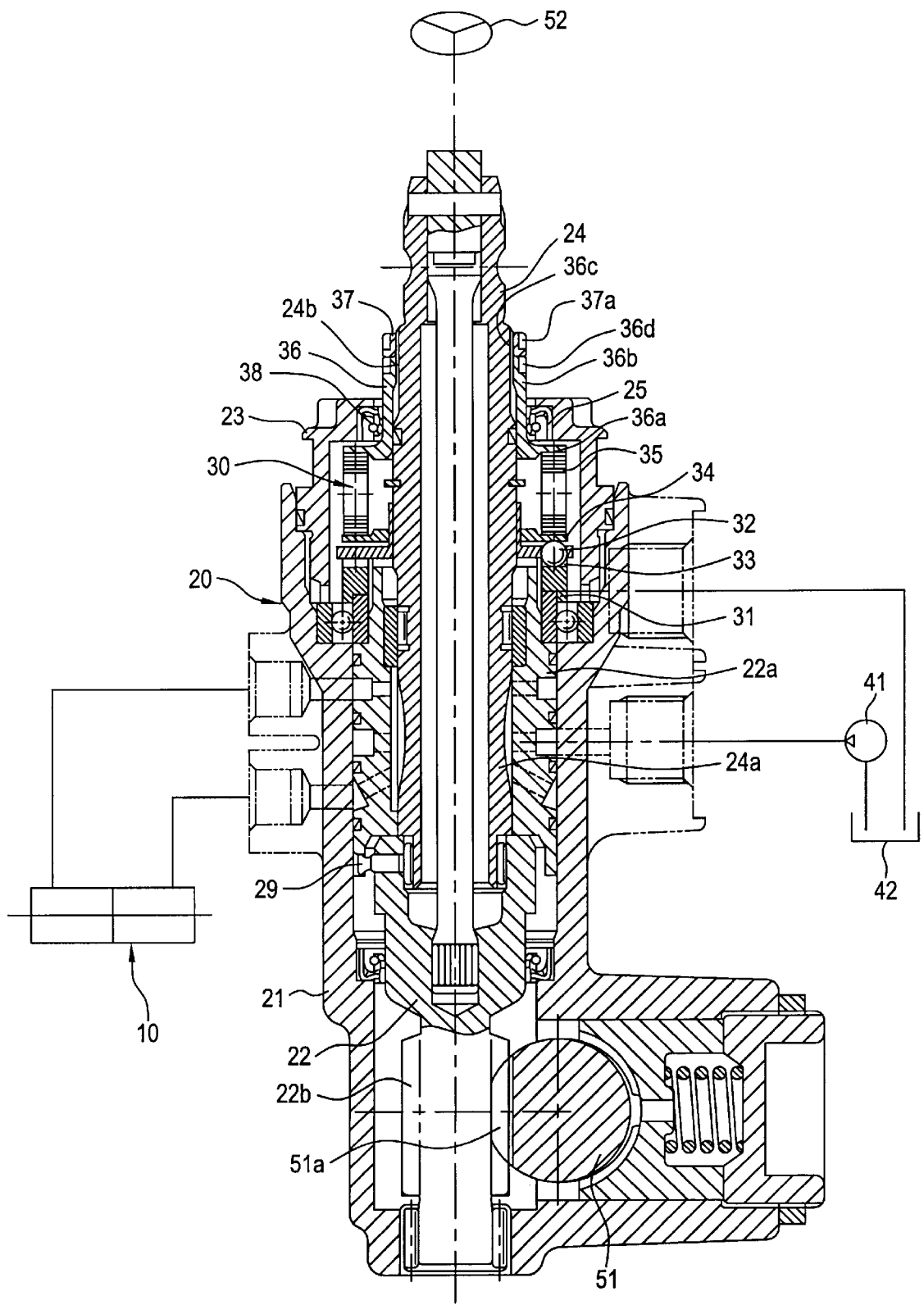
FIG. 1 is a vertical sectional view of a control valve assembly for a power cylinder in a power-assisted steering system.

In FIG. 1 of the drawings, there is illustrated a control valve assembly 20 for a power cylinder 10 in a power-assisted steering device of the rack-and-pinion type. The control valve assembly 20 includes an output shaft 22 rotatably mounted within a housing body 21, a valve sleeve 22a connected to the output shaft 22 by means of a radial pin 29 for rotation therewith, a valve rotor 24a integrally formed with a hollow input shaft 24 extended outwardly from the housing body 21 through a housing cap 23 for connection to a steering wheel 52 and rotatably coupled within the valve sleeve 22a, and a torsion bar 25 connecting the input shaft 24 to the output shaft 22. When the input shaft 24 is applied with a steering torque, the torsion bar 25 is twisted to cause relative rotation of the valve sleeve 22a and valve rotor 24a thereby to control hydraulic fluid under pressure supplied to and discharged from the power cylinder 10 therethrough.

The output shaft 22 is formed with a pinion 22b in meshing engagement with a toothed portion 51a of a rack bar 51 mounted within the housing body 21 to be displaceable in a lateral direction and operatively connected at opposite ends thereof with a pair of dirigible road wheels (not shown). The input shaft 24 is connected at its upper end to the steering wheel 52 through an intermediate shaft and a steering main shaft (not shown).

The control valve assembly 20 is provided with an adjusting mechanism 30 for adjustment of a steering effort to be applied to the steering wheel 52 placed in a neutral position. The adjusting mechanism 30 includes a ring member 31 formed with circumferentially equally spaced radial V-grooves 31a shown in FIGS. 2–4, an annular ball retainer 32 formed with circumferentially equally spaced mounting holes 32a shown in FIGS. 5–7, balls 33 of steel metal coupled within the mounting holes 32a of ball retainer 32 and engaged with the V-grooves 31a of ring member 31, circumferentially equally spaced coil springs 35 for biasing the balls 33 toward the V-grooves 31a through an annular spring retainer 34, an adjusting screw 36 for adjusting the biasing force of coil springs 35, and a lock nut 37 fastened to the upper end portion of input shaft 24.

Figure 2:
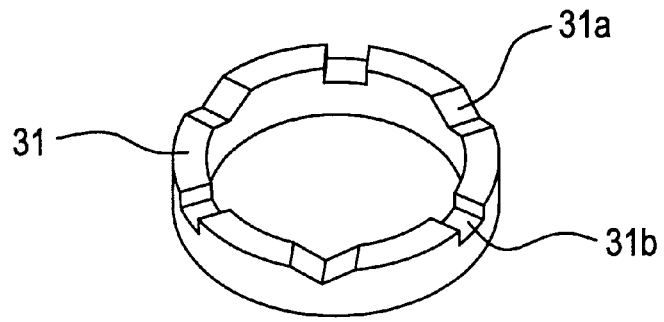
FIG. 2 is a perspective view of a ring member shown in FIG. 1.
Figure 3:
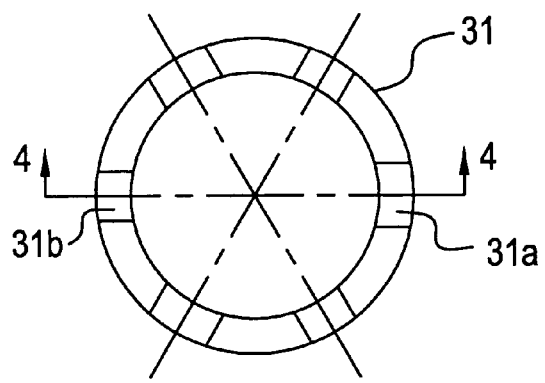
FIG. 3 is a plan view of the ring member shown in FIG. 1.
Figure 4:
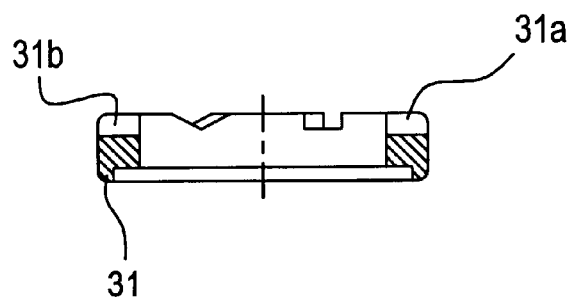
FIG. 4 is a cross-sectional view taken along line 4—4 in FIG. 3.

As shown in FIG. 1, the ring member 31 is fixed to an upper end of the valve sleeve 22a by screw connection. As shown in FIGS. 2–4, the ring member 31 is formed thereon with the radial V-grooves 31a circumferentially equally spaced at an angle of 120 degrees and radial recesses 31b located between the V-grooves 31a. The radial recesses 31b are utilized to be engaged with a fastening tool (not shown) when the ring member 31 is assembled with the valve sleeve 22a and to permit the flow of hydraulic fluid discharged from the interior of valve assembly 20 into a fluid reservoir 42 therethrough.

Figure 5:
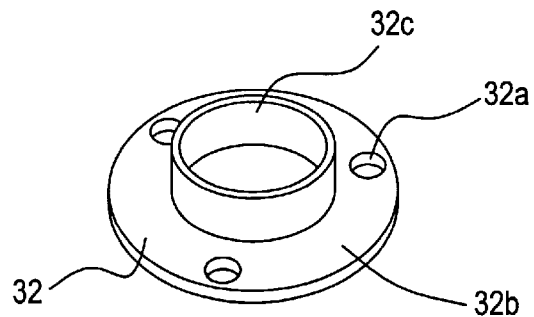
FIG. 5 is a perspective view of a ball retainer shown in FIG. 1.
Figure 6:
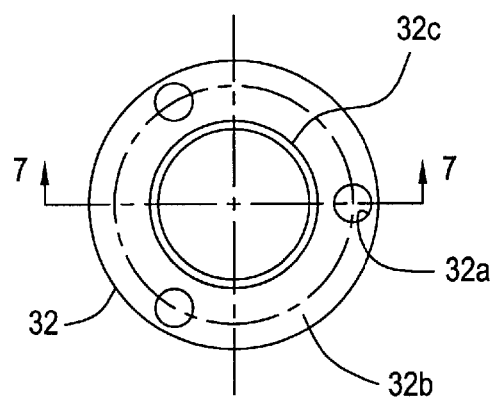
FIG. 6 is a plan view of the ball retainer shown in FIG. 1.
Figure 7:
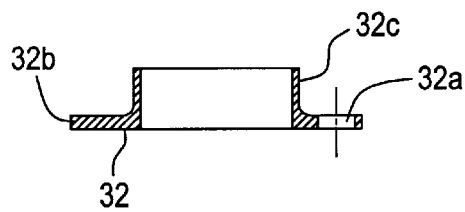
FIG. 7 is a cross-sectional view taken along line 7—7 in FIG. 6.

As shown in FIGS. 5–7, the ball retainer 32 has an annular flange 32b formed with the mounting holes 32a circumferentially equally spaced at an angle of 120 degrees and a cylindrical portion 32c integrally formed with the annular flange 32b at its inner periphery. The ball retainer 32 is coupled with the input shaft 24 at its cylindrical portion 32c and fixed to the input shaft 24 by caulking after positioned to correspond with the ring member 31 in phase.

The adjusting screw 36 has an annular flange 36a for engagement with the coil springs 35 and a cylindrical portion 36b integrally formed with the annular flange 36a at its inner periphery. The cylindrical portion 36b of adjusting screw 36 is axially slidably coupled with the input shaft 24 through an O-ring 38 and is extended outwardly from the housing body 21 through the housing cap 23. The cylindrical portion 36b of adjusting screw 36 is formed at its inner periphery with a female screw 36c in engagement with a male screw 24b formed on the upper end portion of input shaft 24. The cylindrical portion 36b of adjusting screw 36 is formed at its outer periphery with a plurality of circumferentially equally spaced recesses 36d to be engaged with a fastening tool (not shown) for positioning the adjusting screw 38. The lock nut 37 is formed with a plurality of circumferential recesses 37a to be engaged with a fastening tool (not shown) when it is desired to fasten the adjusting screw 36 to the input shaft 24.

Figure 8:
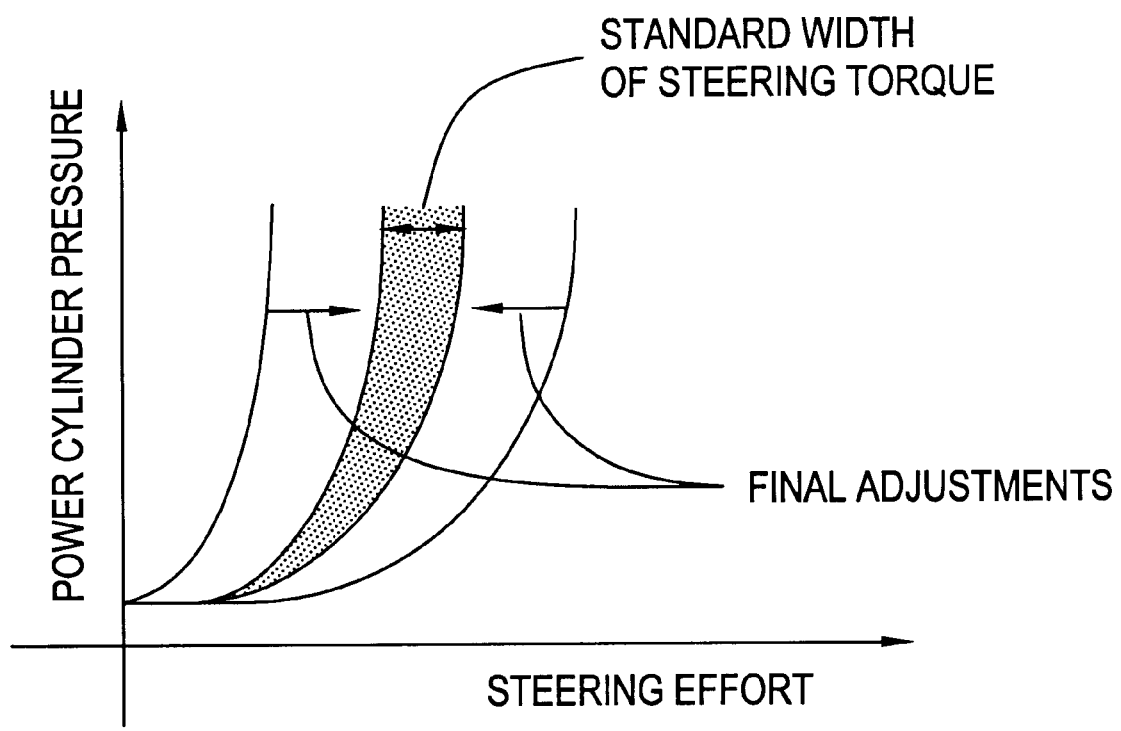
FIG. 8 is a graph showing a power cylinder pressure in relation to a steering effort applied to a steering wheel.

Since the adjusting screw 36 and lock nut 37 of the adjusting mechanism 30 are located outside the housing body 21 of the control valve assembly 20, the lock nut 37 can be released after assembly of the control valve assembly 20 to move the adjusting screw 36 forward or backward. In this instance, the adjusting screw 36 is positioned to adjust a steering effort to be applied to the steering wheel 52 placed in the neutral position, and the lock nut 37 is fastened to retain the adjusting screw 36 in its adjusted position. Thus, the steering effort to be applied to the steering wheel placed in the neutral position can be adjusted in a simple manner without disassembling the control vale assembly 20. In this embodiment, the steering effort is adjusted by adjustment of an steering torque for effecting relative rotation of the valve sleeve 22a and valve rotor 24a in a condition where the steering wheel 52 is placed in the neutral position. Thus, the steering effort can be adjusted in a simple manner as shown in FIG. 8 before the control valve assembly 20 is mounted on the vehicle body structure or after the control valve assembly 20 has been mounted on the vehicle body structure. The steering effort can be also adjusted at a time when the characteristic of the control valve assembly 20 is finally checked after assembly of the vehicle. This is useful to facilitate adjustment of the steering characteristic of the vehicle at its shipment stage. After shipment of the vehicle, the steering effort can be adjusted by a user to a desired value a simple manner.

In addition, the adjusting mechanism 30 of the control valve assembly 20 can be provided In a compact size since the adjusting screw 38 and lock nut 37 are assembled with the input shaft 24 extended outwardly from the housing body 21 through the housing cap 23 for connection to the steering wheel 52.

What is claimed is:

1. An adjusting mechanism in control valve assembly for a power cylinder in a power-assisted steering system for adjusting a steering effort to be applied to a steering wheel placed in a neutral position, the adjusting mechanism including resilient means for applying a load against the steering effort to the components of said control valve assembly and an adjusting element for adjusting the load applied to the components of said control valve assembly, wherein the adjusting element of said adjusting mechanism is an adjusting screw located partially inside and partially outside a housing of said control valve assembly at an input side of the steering effort to be operated for adjustment of the steering effort.

2. An adjusting mechanism in a control valve assembly as claimed in claim 1, wherein the adjusting screw is coaxially assembled with an input shaft, the input shaft extended outwardly from the housing of said control valve assembly for connection to the steering wheel to be operated outside the housing of said control valve assembly.

3. An adjusting mechanism in a control valve assembly for a power cylinder in a power-assisted steering system of an automotive vehicle for adjusting a steering effort to be applied to a steering wheel placed in a neutral position, said control valve assembly including a housing body, a hollow input shaft rotatably mounted within said housing body and extended outwardly from said housing body for connection to said steering wheel, an output shaft rotatably mounted within said housing body coaxially with said input shaft, a valve rotor integrally formed with said input shaft for rotation therewith, a valve sleeve connected to said output shaft for rotation therewith and rotatably coupled with said valve rotor, and a torsion bar connected at opposite ends thereof with said input shaft and said output shaft, wherein said adjusting mechanism comprises a ring member formed with a plurality of circumferentially spaced radial V-grooves and fixed to one end of said valve sleeve, an annular ball retainer formed with a plurality of circumferentially spaced mounting holes and axially slidably coupled with said input shaft, a plurality of balls coupled within the mounting holes of said ball retainer and engaged with the V-grooves of said ring member, an adjusting screw coupled with said input shaft to be fastened in an adjusted position in an axial direction of said input shaft, said adjusting screw having a cylindrical portion axially slidably coupled with said input shaft and extended outwardly from said housing body to be operated by a user and an annular flange integrally formed with an inner end of said cylindrical portion, and resilient means disposed between said ball retainer and the annular flange of said adjusting screw for basing said balls toward said ring member.

* * * * *